United States Patent
Wolk

(10) Patent No.: US 7,264,020 B2
(45) Date of Patent: Sep. 4, 2007

(54) ACCESSIBLE TEST FITTING FOR A PLUMBING SYSTEM

(76) Inventor: James Wolk, 1900 Cherokee, Leavenworth, KS (US) 66048

( * ) Notice: Subject to any disclaimer, the term of this patent is extended or adjusted under 35 U.S.C. 154(b) by 141 days.

(21) Appl. No.: 11/170,603

(22) Filed: Jun. 29, 2005

(65) Prior Publication Data

US 2007/0006929 A1    Jan. 11, 2007

(51) Int. Cl.
*F16L 55/10* (2006.01)
(52) U.S. Cl. .......................... 138/90; 138/89
(58) Field of Classification Search .............. 138/90, 138/89
See application file for complete search history.

(56) References Cited

U.S. PATENT DOCUMENTS

| | | | |
|---|---|---|---|
| 2,102,434 A * | 12/1937 | Osborn | 285/37 |
| 4,185,492 A | 1/1980 | Hauk et al. | |
| 4,375,297 A | 3/1983 | Persson | |
| 4,429,568 A | 2/1984 | Sullivan | |
| 4,602,504 A | 7/1986 | Barber | |
| 4,830,041 A * | 5/1989 | Sadowski et al. | 137/246 |
| 4,936,350 A * | 6/1990 | Huber | 138/90 |
| 5,163,480 A | 11/1992 | Huber | |
| 5,372,032 A | 12/1994 | Filippi et al. | |
| 5,610,323 A | 3/1997 | Ashworth | |
| 5,620,020 A | 4/1997 | Collins | |
| 6,216,724 B1 * | 4/2001 | Niinivaara | 137/318 |
| 6,348,869 B1 | 2/2002 | Ashworth | |
| 6,390,118 B1 | 5/2002 | Mankins | |
| 6,453,728 B2 | 9/2002 | Messmann | |
| 6,553,842 B1 | 4/2003 | Tebeau | |
| 6,581,642 B1 | 6/2003 | Ritchie et al. | |
| 6,588,454 B1 | 7/2003 | Johnson et al. | |
| 6,595,242 B2 | 7/2003 | Duncan | |
| 6,655,413 B2 | 12/2003 | Condon et al. | |
| 6,672,139 B2 | 1/2004 | Pampinella | |
| 6,843,108 B1 | 1/2005 | Hunt | |

* cited by examiner

*Primary Examiner*—James Hook
(74) *Attorney, Agent, or Firm*—Lathrop & Gage, LC

(57) ABSTRACT

A test fitting for installation in a plumbing system comprises an annular sleeve having opposed first and second open ends and an inner surface that defines an open interior space and a hole. A cord has a first portion removably positioned in the sleeve's interior space and a second portion extending through the hole for removing the cord from the interior space through the hole. The first portion of the cord forms a watertight spiral disc that extends across the interior space to define a first area completely separated from a second area, and an outer edge of the spiral disc may be supported by a ledge extending from the inner surface into the interior space. Means are included for selectively sealing the hole after the cord is withdrawn through the hole, such as a plug complementary to the hole.

9 Claims, 7 Drawing Sheets

US 7,264,020 B2

ACCESSIBLE TEST FITTING FOR A PLUMBING SYSTEM

BACKGROUND OF THE INVENTION

This invention relates generally to a test fitting for a plumbing system. In particular, the present invention relates to an easily-accessible test fitting that is permanently installed in a plumbing system for temporarily blocking the passage of water.

Residential and commercial plumbing systems are created by joining together various sections of pipe into a unified network. However, even a single joint that is not watertight will allow water to leak and necessitate repairs. To detect such a problem early in the construction process, many building codes today require the plumbing system to be pressure tested.

When a plumbing system is pressure tested, a blocking apparatus or "test fitting" is introduced into a section of pipe to isolate an area to be tested. Water is then added, filling the isolated section, and a plumber or inspector can check the joints above the test fitting for leaks. When it is clear that there are no leaks, the test fitting may be removed.

Traditionally when a blocking apparatus was to be added for a pressure test, a section of pipe was cut open and the blocking apparatus was connected. While effective for testing above the blocking apparatus, this breaches the integrity of the cut pipe and requires additional joints to reunite the cut pipe at the test's conclusion.

To facilitate this testing process, various proposals for test fittings are found in the art that are intended to be included in the plumbing system as it is constructed, such as in U.S. Pat. Nos. 4,602,504; 5,163,480; 6,390,118; and 6,595,242. These fittings are installed next to "T" or "Y" sections of pipe to allow a plumber access to remove the blocking apparatus when the pressure test is completed. After the blocking apparatus is removed, the free end of the "T" or "Y" section is capped. The "T" or "Y" section requires a significant amount of space to be installed and remains in the system after the test is completed.

SUMMARY OF THE INVENTION

A test fitting according to the present invention comprises an annular sleeve having opposed first and second open ends and an inner surface that defines an open interior space and a hole. A cord has a first portion removably positioned in the sleeve's interior space and a second portion extending through the hole for removing the cord from the interior space through the hole. The first portion of the cord forms a watertight spiral disc that extends across the interior space to define a first area completely separated from a second area, and a plug complementary to the hole may selectively seal the hole after the cord is withdrawn through the hole.

A test fitting according to another embodiment of the present invention comprises an annular sleeve having opposed first and second open ends and an inner surface that defines an open interior space and a hole. The sleeve includes a ledge that extends from the inner surface into the interior space. A cord has a first end removably positioned in the sleeve's interior space and a second end extending through the hole for removing the cord from the interior space through the hole. The first end of the cord forms a watertight spiral disc that extends across the interior space to define a first area completely separated from a second area, and an outer edge of the spiral disc is supported by the ledge. Means are included for selectively sealing the hole after the cord is withdrawn through the hole.

DESCRIPTION OF THE PREFERRED EMBODIMENT

Figure 1:
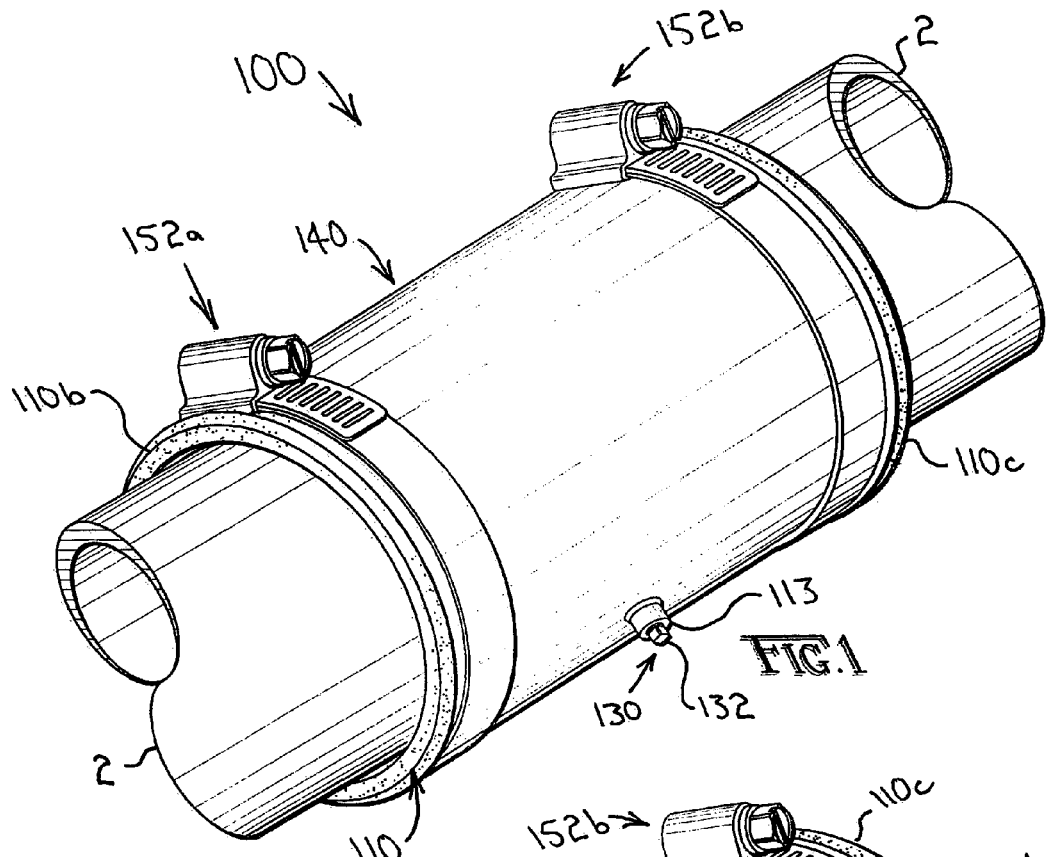
FIG. 1 shows a pipe test fitting according to the current invention after a cord is removed and a plug is inserted. The pipe test fitting is attached to a plumbing system.
Figure 6:
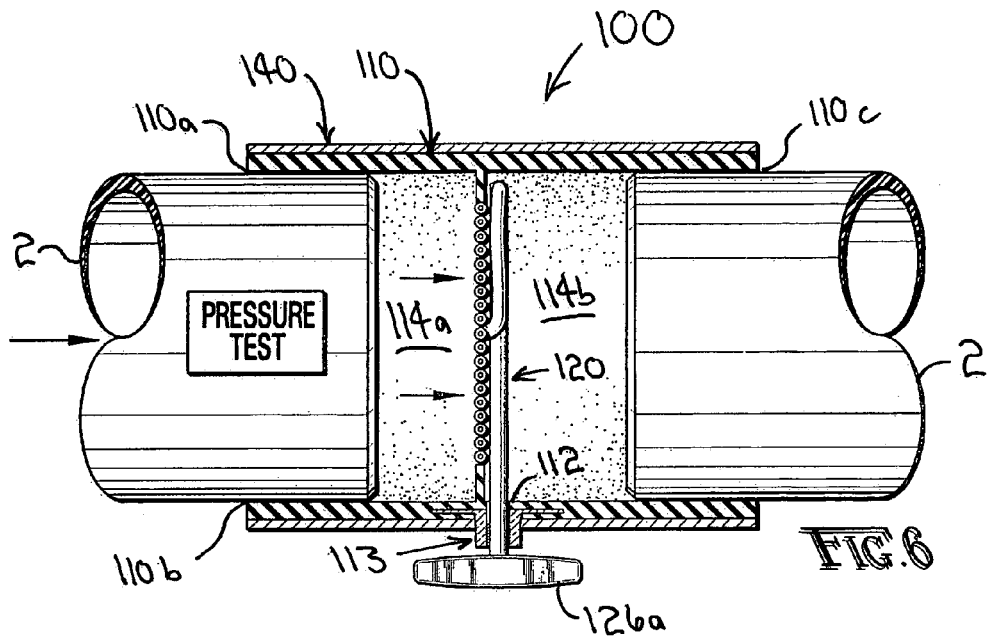
FIG. 6 shows a sectional view of the pipe test fitting as in FIG. 2 during a pressure test. Arrows indicate the direction of fluid flow.
Figure 7:
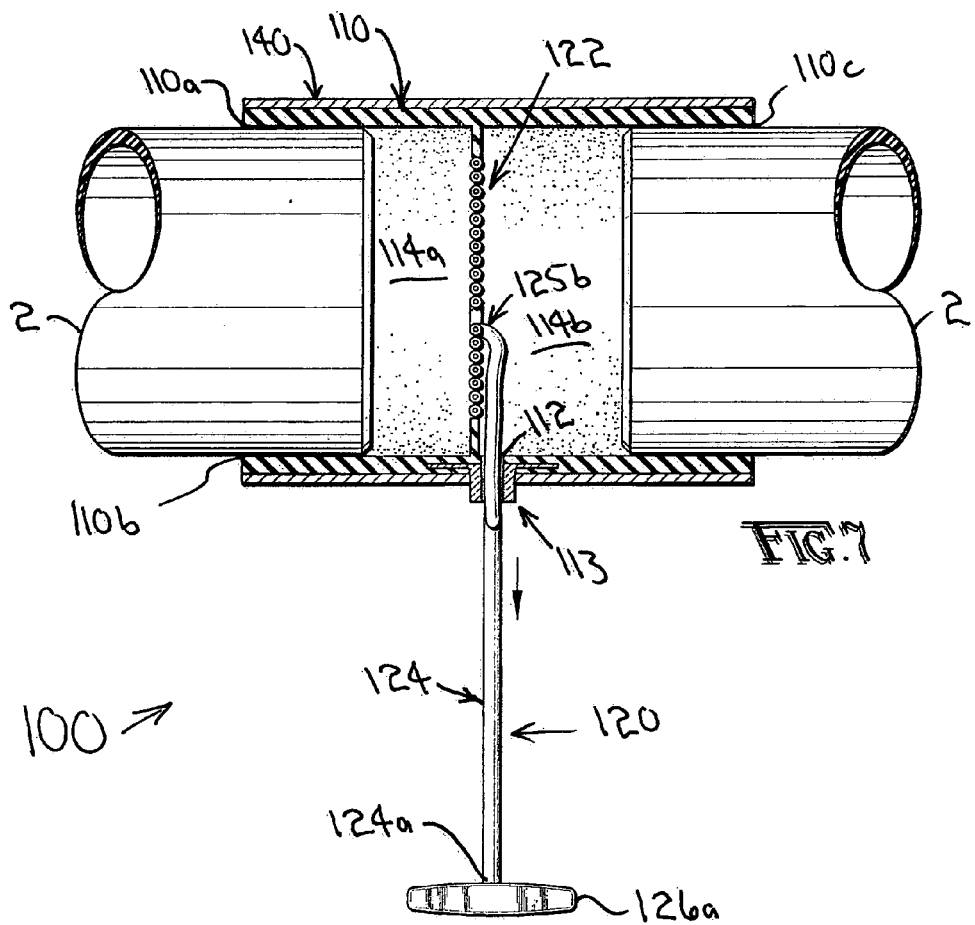
FIG. 7 shows a sectional view of the pipe test fitting as in FIG. 6 as the cord is being removed.
Figure 8:
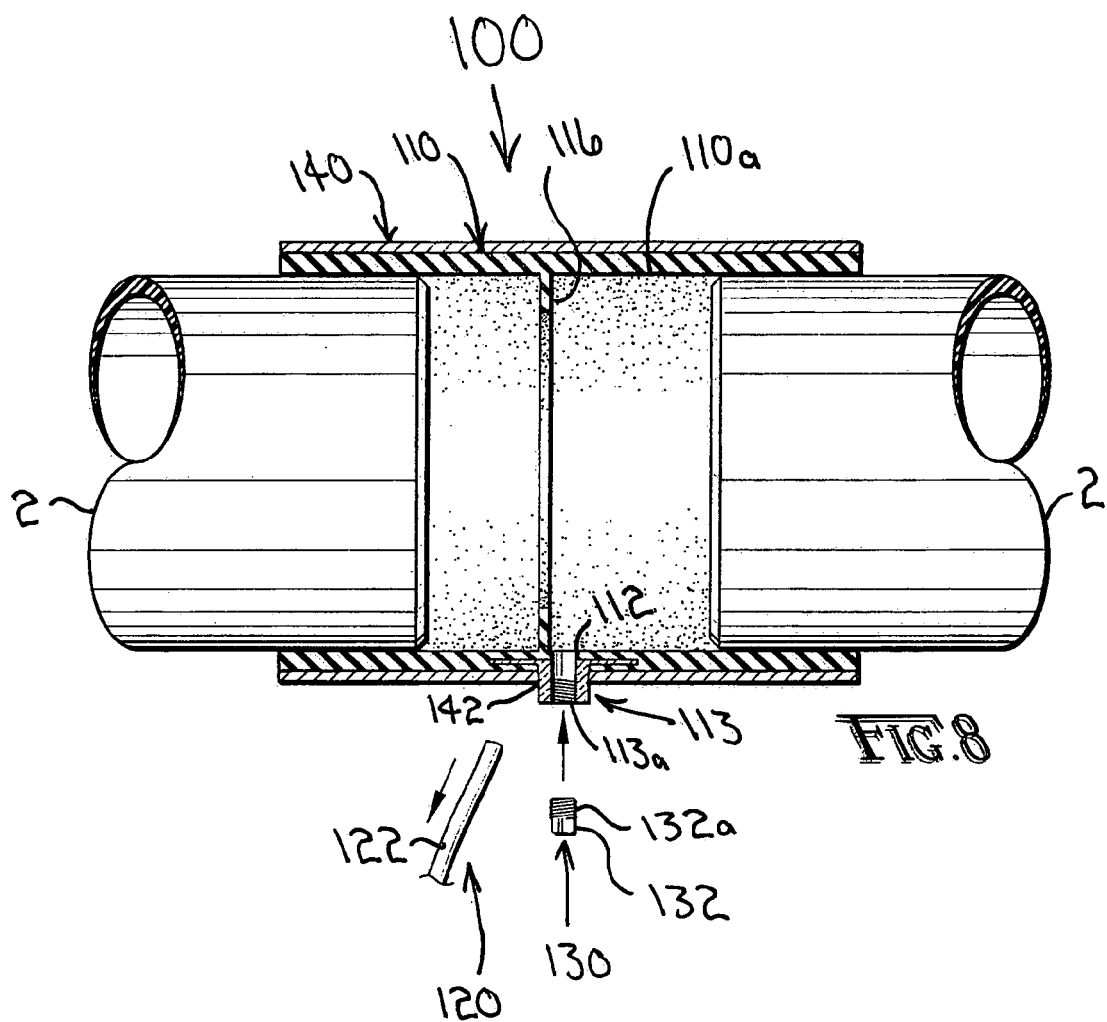
FIG. 8 shows a sectional view of the pipe test fitting as in FIG. 7. Arrows indicate the removal of the cord and the insertion of the plug.

An accessible test fitting according to the present invention for use in a plumbing system will now be described in detail with reference to FIGS. 1 through 9 of the accompanying drawings. More particularly, a test fitting 100 for installation in a plumbing system includes an annular sleeve 110 defining a hole 112 (FIGS. 3 through 9), a cord 120 (FIGS. 1 through 6 and 9), and means 130 for selectively sealing the hole 112 (FIGS. 1 and 8). The plumbing system comprises a plurality of pipes 2.

Figure 2:
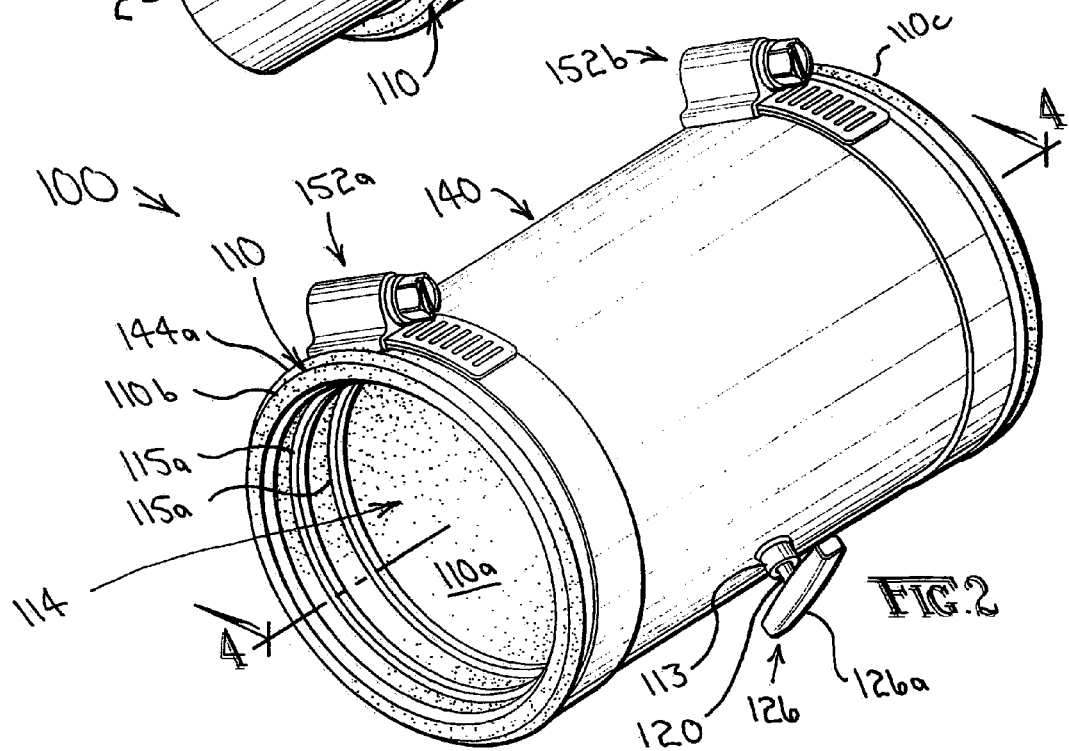
FIG. 2 shows the pipe test fitting as in FIG. 1 before the cord is removed.

The annular sleeve 110 has an inner surface 110a, defines an open interior space 114 as shown in FIG. 2, and presents opposed first and second ends 110b, 110c. The respective first and second ends 110b, 110c each attach to a respective pipe 2 in the plumbing system as shown in FIGS. 1, 2, 4, and 6 through 9. The inner surface 110a defines the hole 112, and a ledge 116 extends from the inner surface 110a into the open interior space 114. The sleeve 110 is preferably constructed of a durable rubber material, and an outlet 113 defining female threads 113a may be located about the hole 112. The outlet 113 is preferably molded in the sleeve 110 about the hole 112, and the outlet 113 may be constructed of a galvanized metal or another material.

Figure 3:
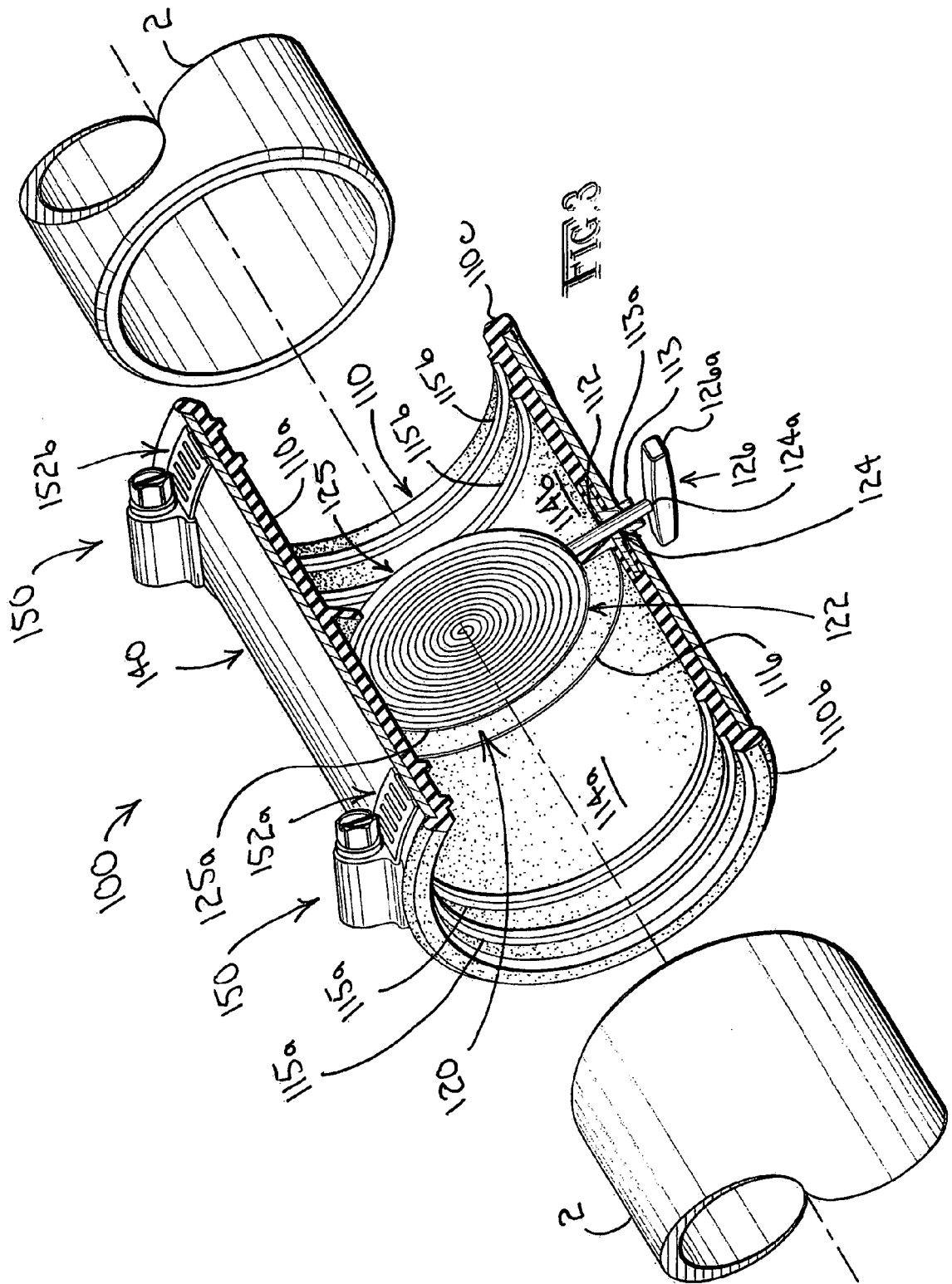
FIG. 3 shows a sectional view of the pipe test fitting as in FIG. 2 exploded from the plumbing system.

The cord 120 has a first portion 122 removably positioned in the sleeve interior space 114 and a second portion 124 extending through the hole 112 for removing the cord 120 through the hole 112. The cord first end 122 preferably forms a watertight spiral disc 125 that extends across the interior space 114 to define a first area 114a completely separated from a second area 114b as shown in FIGS. 3, 6, and 7. An outer edge 125a of the spiral disc 125 is preferably supported by the ledge 116, and the spiral disc outer edge 125a may be temporarily adhered to the ledge 116.

Figure 4:
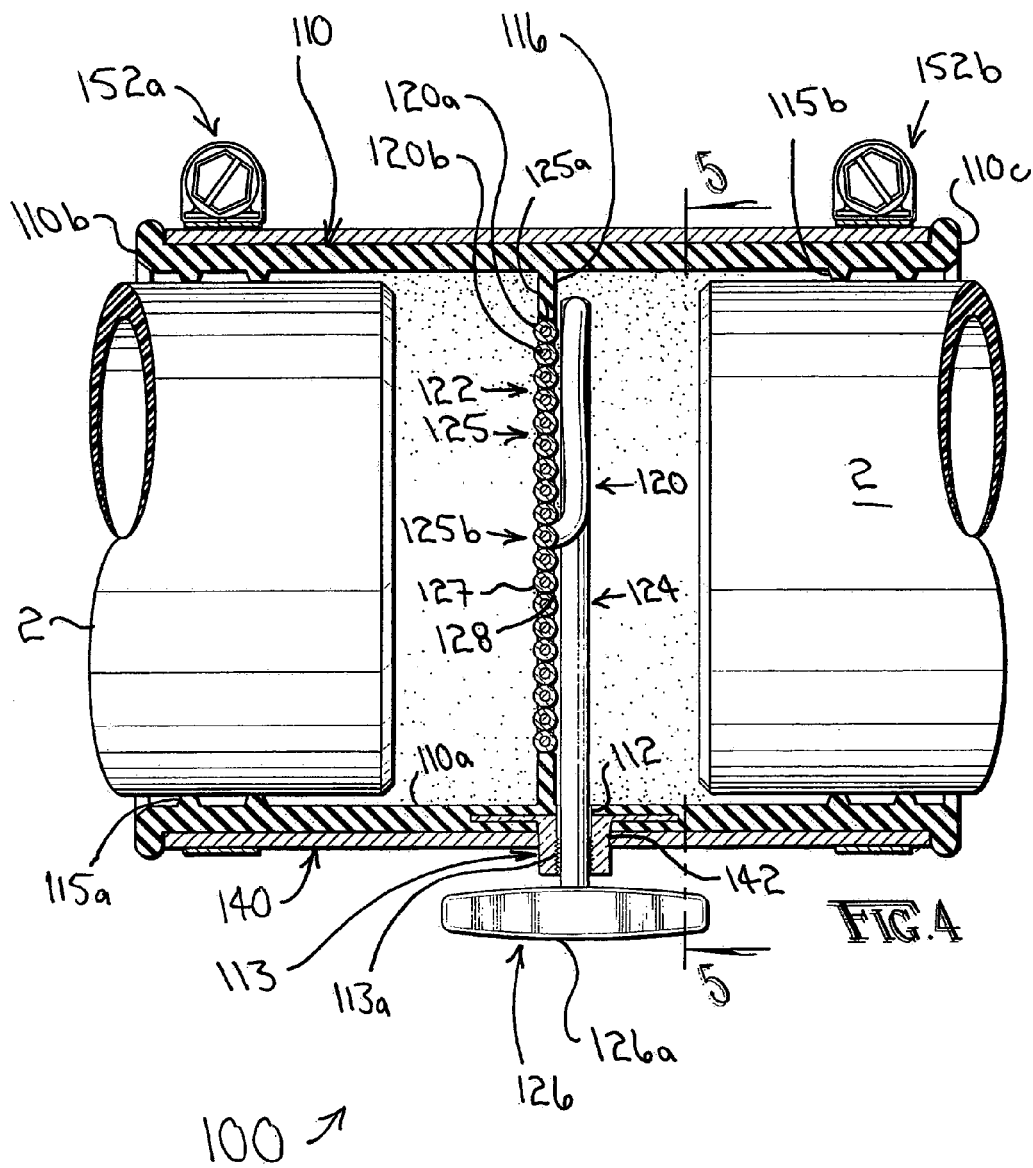
FIG. 4 shows a sectional view of the pipe test fitting as in FIG. 2 attached to the plumbing system.
Figure 5:
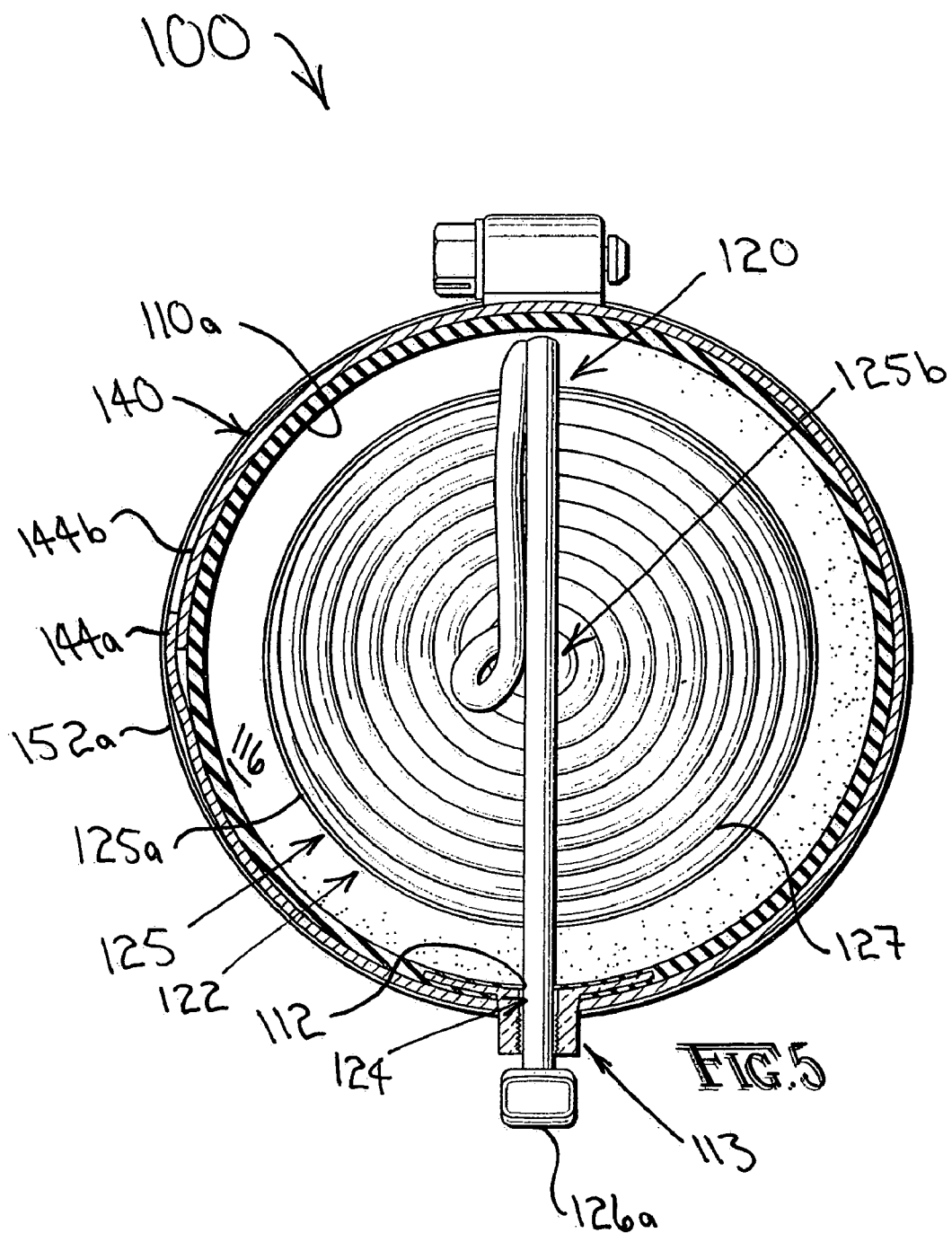
FIG. 5 shows a sectional view taken from FIG. 4.

The cord 120 preferably includes a durable rubber material 120a encasing a flexible wire 120b as shown in FIG. 4, and a handle 126 may be attached to an outer end 124a of the cord second portion 124. The flexible wire 120b is preferably a metal wire, though other flexible wires may be used. Though the handle 126 may take numerous forms and configurations, the handle 126 is preferably a tee handle 126a that is easy to manufacture and operate. The spiral disc 125 preferably includes a spiral valley 127 surrounding the flexible wire 120b to ease the withdrawal of the cord 120 through the hole 112 by allowing the spiral disc 125 to separate along the spiral valley 127 when the cord second portion 124 is pulled (FIGS. 4 and 5). A second spiral valley 128 may also be included on an opposing face of the spiral disc 125 to further ease the separation of the spiral disc 125. The cord second portion 124 preferably meets the cord first portion 122 at a center 125b (FIGS. 4 and 5) of the spiral disc 125 to allow the spiral disc 125 to be easily separated when the cord second portion 124 is pulled.

A sheathing 140 encompasses the inner surface 110a. The sheathing 140 defines a sheathing hole 142 outwardly adjacent the inner surface hole 112 and may include unattached and overlapping first and second ends 144a, 144b distant from the sheathing hole 142, as shown in FIG. 5. The sheathing 140 is preferably constructed of a durable yet flexible material for preventing damage to the inner surface 110a, such as metal.

Respective means 150 for attaching the first and second ends 110b, 110c to pipes 2 preferably includes respective first and second hose clamps 152a, 152b positioned outside the inner surface 110a at both the first and second ends 110b, 110c as shown throughout the figures. The first hose clamp 152a is preferably positioned adjacent the sleeve first end 110b and outwardly adjacent the sheathing 140 for attaching the sleeve first end 110b to one of the pipes 2, and the second hose clamp 152b is preferably positioned adjacent the sleeve second end 110c and outwardly adjacent the sheathing 140 for attaching the sleeve second end 110c to another of the pipes 2. The sleeve first end 110b preferably includes a plurality of consecutive ridges 115a to seal the sleeve first end 110b to the adjacent respective pipe 2, and the sleeve second end 110c preferably includes a plurality of consecutive ridges 115b to seal the sleeve second end 110c to the adjacent respective pipe 2. Other means 150 may be used instead of or in addition to the hose clamps 152a, 152b, including adhesive, threaded connections, and welding, for example.

The means 130 for selectively sealing the hole 112 after the cord 120 is withdrawn through the hole 112 preferably includes a plug 132, as shown in FIGS. 1 and 8. The plug 132 is complementary to the hole 112, and the plug 132 preferably includes male threads 132a complementary to the outlet female threads 113a so that the plug 132 may be received by the outlet 113 to selectively seal the hole 112 after the cord 120 is withdrawn through the hole 112.

The test fitting 100 preferably includes indicia, such as color indicia, to visibly differentiate the test fitting 100 from the remainder of the plumbing system. The indicia may be included on the sheathing 140, and/or the first and second hose clamps 152a, 152b may include the indicia.

In use, the sheathing 140 encompasses the inner surface 110a, and the watertight spiral disc 125 formed by the cord first end 122 is positioned in the sleeve interior space 114 and supported by the ledge 116 (FIG. 3). The spiral disc outer edge 125a may be temporarily adhered to the ledge 116. The cord second portion 124 is extended through the holes 112, 142, and the tee handle 126a is attached to the cord second portion outer end 124a. The test fitting 100 may then be incorporated into the plumbing system.

To incorporate the test fitting 100 into the plumbing system as shown in FIG. 4, one of the pipes 2 is positioned inside the inner surface 110a through the first end 110b, and the first hose clamp 152a is tightened, causing the ridges 115a to compress and seal the sleeve first end 110b to the pipe 2. Another pipe 2 is then positioned inside the inner surface 110a through the second end 110c, and the second hose clamp 152b is tightened, causing the ridges 115b to compress and seal the sleeve second end 110c to the pipe 2. The indicia clearly visibly differentiates the test fitting 100 from the remainder of the plumbing system, allowing the test fitting 100 to be easily located. The test fitting 100 may then be used to pressure-test the plumbing system.

Figure 9:
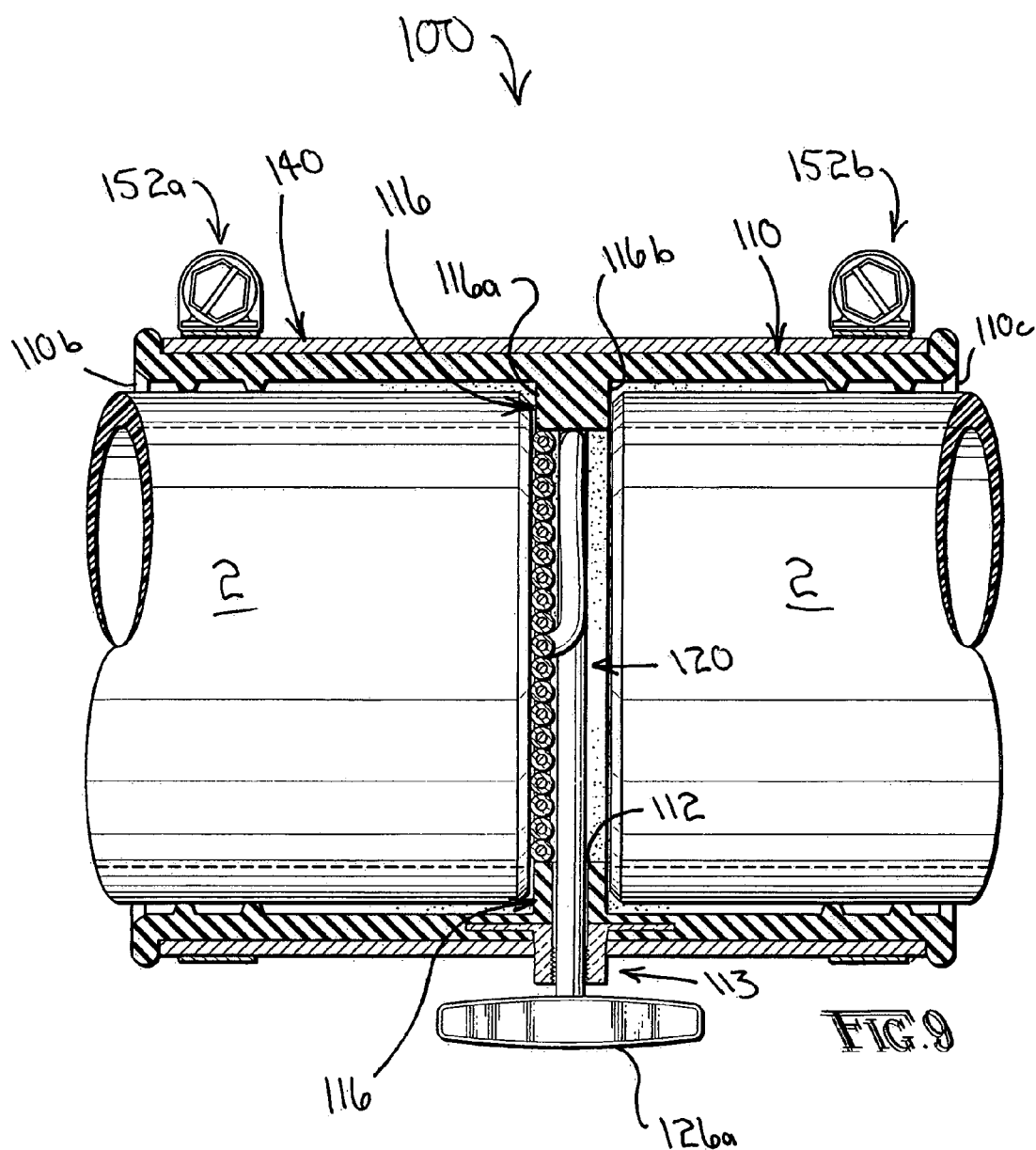
FIG. 9 shows a sectional view of another pipe test fitting according to the current invention.

In a particularly preferred embodiment, shown in FIG. 9, the hole 112 extends through the ledge 116. When the test fitting 100 is incorporated into the plumbing system, one of the pipes 2 abuts a first side 116a of the ledge 116 and another of the pipes 2 abuts a second side 116b of the ledge 116. This configuration provides an extremely stable and watertight connection between the adjoined pipes 2.

To pressure-test the plumbing system as shown in FIG. 6, water (or another fluid) is introduced into the plumbing system pipes 2 and the test fitting first area 114a in a manner known in the art. The spiral disc 125 restricts the fluid from entering the test fitting second area 114b and pipes 2 that extend from the test fitting second end 110c. When the fluid reaches a predetermined pressure, leaks may be detected in the portion of the plumbing system being tested by a simple inspection that is known in the art.

After the plumbing system is inspected for leaks, the cord handle 126 may be pulled as shown in FIG. 7, separating the spiral disc 125 along the spiral valley 127 and withdrawing the cord 120 through the hole 112. The fluid may then pass through the test fitting second area 114b and the pipes 2 that extend from the test fitting second end 110c to an attached drain. After the cord 120 is withdrawn through the hole 112, the plug 132 may be inserted in the outlet 113 to seal the hole 112 with only a minimal amount of fluid escaping through the hole 112 (FIG. 8).

It is understood that while certain forms of this invention have been illustrated and described, it is not limited thereto except insofar as such limitations are included in the following claims and allowable functional equivalents thereof.

What is claimed is as follows:

1. A test fitting for installation in a plumbing system, said test fitting comprising:
    an annular sleeve having opposed first and second open ends and an inner surface, said inner surface defining an open interior space and a hole;
    a cord having a first portion removably positioned in said sleeve interior space and a second portion extending through said hole for removing said cord through said hole, said cord first portion forming a watertight spiral disc extending across said interior space to define a first area completely separated from a second area; and
    a plug complementary to said hole for selectively sealing said hole after said cord is withdrawn through said hole;
    wherein said sleeve includes a ledge extending from said inner surface into said interior space for selectively supporting an outer edge of said spiral disc;
    wherein said hole extends through said ledge;
    wherein the plumbing system comprises a plurality of pipes;
    wherein one of the pipes abuts a first side of said ledge;
    wherein another of the pipes abuts a second side of said ledge;
    wherein said test fitting further comprises means for attaching said sleeve first end to the one of the pipes and means for attaching said sleeve second end to the another of the pipes.

2. A test fitting for installation in a plumbing system, said test fitting comprising:
- an annular sleeve having opposed first and second open ends and an inner surface,
- said inner surface defining an open interior space and a hole;
- a cord having a first portion removably positioned in said sleeve interior space and a second portion extending through said hole for removing said cord through said hole, said cord first portion forming a watertight spiral disc extending across said interior space to define a first area completely separated from a second area;
- a plug complementary to said hole for selectively sealing said hole after said cord is withdrawn through said hole; and
- a sheathing encompassing said inner surface and defining a sheathing hole adjacent said inner surface hole;
- wherein the plumbing system comprises a plurality of pipes;
- wherein said sheathing includes unattached and overlapping first and second ends;
- wherein said test fitting further comprises:
  - a first hose clamp adjacent said sleeve first end and outwardly adjacent said sheathing for attaching said sleeve first end to one of the pipes;
  - a second hose clamp adjacent said sleeve second end and outwardly adjacent said sheathing for attaching said sleeve second end to another of the pipes.

3. The test fitting as in claim 2, wherein said sheathing first and second ends are distant from said sheathing hole.

4. The test fitting as in claim 2, wherein said first and second hose clamps include color indicia to visibly differentiate said test fitting from the remainder of the plumbing system.

5. The test fitting as in claim 2, wherein:
- said sleeve first end includes a plurality of consecutive ridges to seal said sleeve first end to said one of the pipes; and
- said sleeve second end includes a plurality of consecutive ridges to seal said sleeve second end to said another of the pipes.

6. The test fitting as in claim 5, wherein said sleeve is constructed of a durable rubber material.

7. The test fitting as in claim 5, wherein:
- said sleeve is constructed of a durable rubber material;
- a metal outlet is molded in said sleeve about said hole, said outlet defining female threads; and
- said plug includes male threads complementary to said outlet female threads for selectively sealing said hole after said cord is withdrawn through said hole.

8. A test fitting for installation in a plumbing system comprising a plurality of pipes, said test fitting comprising:
- an annular sleeve having opposed first and second ends and an inner surface, said inner surface defining a hole and an open interior space, said sleeve including a ledge extending from said inner surface into said interior space;
- a cord having a first end removably positioned in said sleeve interior space and a second end extending through said hole for removing said cord through said hole, said cord first end forming a watertight spiral disc extending across said interior space to define a first area completely separated from a second area, an outer edge of said spiral disc being supported by said ledge;
- means for selectively sealing said hole after said cord is withdrawn through said hole;
- a sheathing encompassing said inner surface and defining a sheathing hole adjacent said inner surface hole, said sheathing including unattached and overlapping first and second ends distant from said sheathing hole;
- a first hose clamp adjacent said sleeve first end and outwardly adjacent said sheathing for attaching said sleeve first end to one of the pipes; and
- a second hose clamp adjacent said sleeve second end and outwardly adjacent said sheathing for attaching said sleeve second end to another of the pipes;
- wherein said first and second hose clamps include color indicia to visibly differentiate said test fitting from the remainder of the plumbing system.

9. The test fitting as in claim 8, wherein:
- said sleeve first end includes a plurality of consecutive ridges to seal said sleeve first end to said one of the pipes;
- said sleeve second end includes a plurality of consecutive ridges to seal said sleeve second end to said another of the pipes;
- said outer edge of said spiral disc is temporarily adhered to said ledge;
- said cord second portion meets said cord first portion at a center of said spiral disc;
- said cord includes a durable rubber material encasing a flexible wire;
- a tee handle is attached to an outer end of said cord second portion; and
- said spiral disc includes a spiral valley surrounding said flexible wire to ease said withdrawal of said cord through said hole.

* * * * *